(12) United States Patent
Mahlich

(10) Patent No.: US 6,681,685 B2
(45) Date of Patent: Jan. 27, 2004

(54) DEVICE FOR PRODUCING MILK FROTH FOR CAPPUCCINO

(75) Inventor: Gotthard Mahlich, Kronberg (DE)

(73) Assignee: Eugster/Frismag AG, Romanshorn (CH)

( * ) Notice: Subject to any disclaimer, the term of this patent is extended or adjusted under 35 U.S.C. 154(b) by 0 days.

(21) Appl. No.: 10/385,443

(22) Filed: Mar. 12, 2003

(65) Prior Publication Data

US 2003/0172816 A1 Sep. 18, 2003

(30) Foreign Application Priority Data

Mar. 13, 2002 (DE) .......................... 202 04 085

(51) Int. Cl.[7] .................. A47J 31/40; A47J 31/44; A47J 31/46; A23C 9/00; A23L 2/26
(52) U.S. Cl. .................. 99/453; 99/293; 99/323.1; 99/452
(58) Field of Search ............ 99/452–455, 275–279, 99/293–295, 291, 289 R, 281–286, 300, 302 R, 323.1–323.3; 261/78.1, 123.124, 126, 121.1, DIG. 16, DIG. 76; 366/101, 163.1, 163.2, 167.1; 426/477

(56) References Cited

U.S. PATENT DOCUMENTS

| | | | | |
|---|---|---|---|---|
| 4,585,357 A | * | 4/1986 | Ogata ................... 99/452 X |
| 4,715,274 A | * | 12/1987 | Paoletti ................... 99/454 |
| 4,735,133 A | * | 4/1988 | Paoletti ................... 99/454 |
| 4,800,805 A | * | 1/1989 | Mahlich et al. ............ 99/293 |
| 4,852,473 A | * | 8/1989 | Azpitarte Bolivar ....... 99/293 |
| 4,922,810 A | * | 5/1990 | Siccardi ............... 99/323.1 |
| 4,949,631 A | * | 8/1990 | Fregnan ................... 99/452 |
| 5,052,289 A | * | 10/1991 | Di Girolamo ............. 99/452 |
| 5,154,112 A | * | 10/1992 | Wettern ................ 99/323.1 |
| 5,295,431 A | * | 3/1994 | Schiettecatte et al. ...... 99/293 |
| 5,335,588 A | * | 8/1994 | Mahlich ................... 99/293 |
| 5,423,245 A | * | 6/1995 | Midden ................... 99/275 |
| 5,464,574 A | * | 11/1995 | Mahlich ................. 261/124 |

\* cited by examiner

Primary Examiner—Timothy F. Simone
(74) Attorney, Agent, or Firm—Venable LLP; Norman N. Kunitz

(57) ABSTRACT

A device for producing milk froth for cappuccino, comprising: a nozzle arrangement disposed downstream of a steam supply line, and containing mixing vacuum chamber into which a steam-nozzle opening opens, and in which an air-milk-mixture supply line, leading from a pre-mixing chamber, terminates, and with the pre-mixing chamber being connected to an air conduit and a milk supply line. The nozzle arrangement further includes a calming portion disposed at an exit of the vacuum-chamber, with one end of the calming portion forming at least one discharge opening for releasing a steam-air-milk mixture from the mixing vacuum-chamber to the outside. The calming portion comprises a plurality of calming conduits that have a parallel flow direction, and that each form a respective discharge opening at one open end for discharging a steam-air-milk-mixture partial flow to the outside.

14 Claims, 1 Drawing Sheet

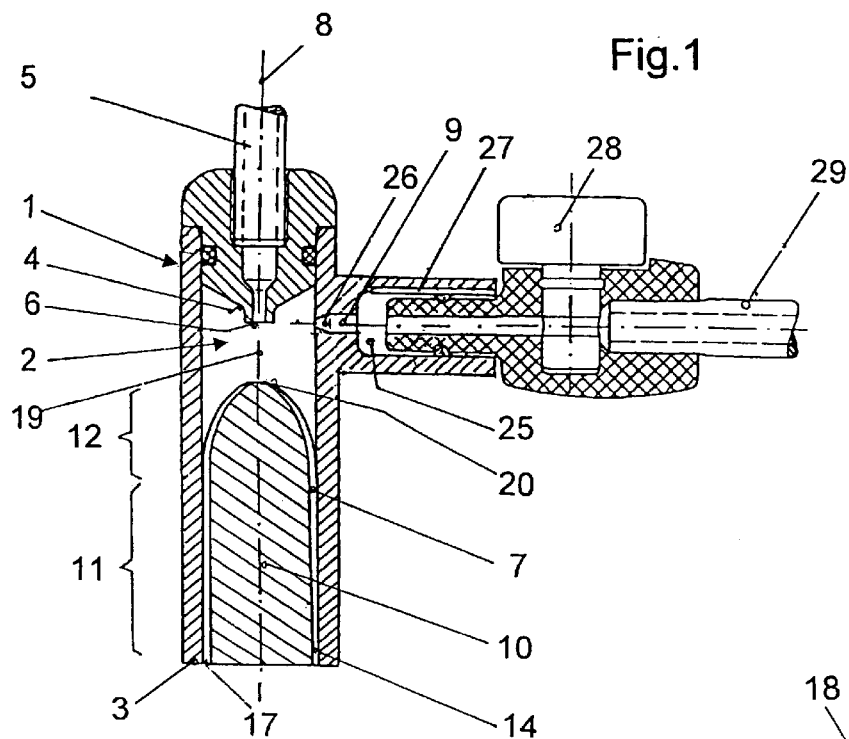
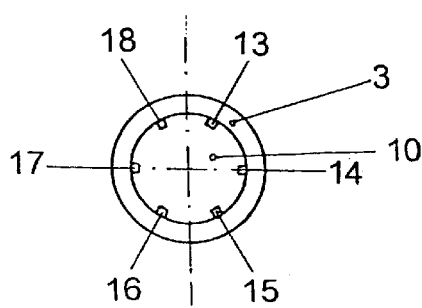
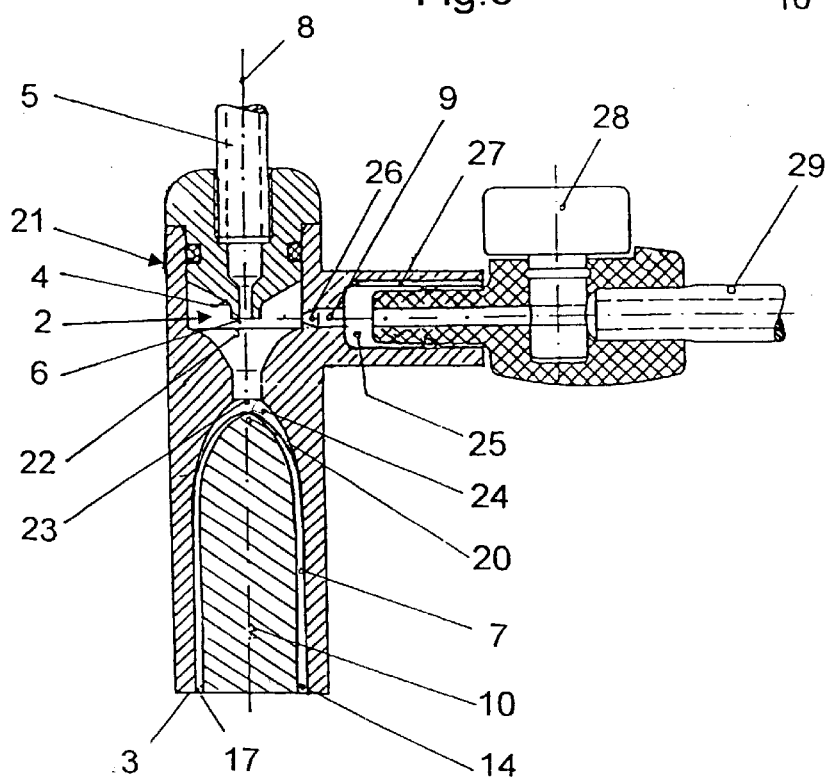

DEVICE FOR PRODUCING MILK FROTH FOR CAPPUCCINO

CROSS REFERENCE TO RELATED APPLICATION

This application claims the priority of German Patent Application DE 202 04 085.2 filed Mar. 13, 2002, which is incorporated herein by reference.

BACKGROUND OF THE INVENTION

The invention relates to a device for producing milk froth for cappuccino.

In a known device of this type (EP 0 858 757 A1), which is connected to an espresso machine and utilizes the machine's steam generator, a nozzle arrangement having a vacuum chamber is disposed downstream of a steam supply line, and a steam-nozzle opening opens into this arrangement. At the vacuum-chamber exit opposite the steam-nozzle opening, the vacuum chamber is nearly conically tapered, and terminates in a single bore serving as a calming segment. A supply line for an air-milk mixture terminates in a cylindrical segment of the vacuum chamber, between the steam-nozzle opening and the vacuum-chamber exit. The pre-mixing chamber is notably cylindrical, has a larger diameter than the supply line for the air-milk mixture, and is connected to an air conduit and a milk supply line. In this pre-mixing chamber, first an air-milk mixture is formed, which then flows into the vacuum chamber. There, steam is added, which creates the vacuum in the vacuum chamber. The resulting steam-air-milk mixture then flows through the calming segment, in which it is compressed and settled, so it exits the calming segment as milk froth, with the desired consistency.

The diameter-to-length ratio of the single bore forming the calming segment is preferably 1:10.

To attain a satisfactory calming effect of the steam-air-milk mixture with a sufficient throughput, the calming segment is relatively long with respect to the other elements of the device, including the dimensions of the vacuum chamber.

It is therefore the object of the present invention to provide a compact device of the type generally described above, with which a steam-air-milk mixture can be produced as milk froth with the desired consistency.

SUMMARY OF THE INVENTION

The above object generally is accomplished according to the invention, by a device for producing milk froth for cappuccino, comprising: a nozzle arrangement that is disposed downstream of a steam supply line, and containing a mixing vacuum chamber into which a steam-nozzle opening opens, and in which an air-milk-mixture supply line, leading from a pre-mixing chamber, terminates, with the pre-mixing chamber being connected to an air conduit and to a milk supply line; and wherein: the nozzle arrangement further includes a calming portion disposed an exit of the vacuum-chamber, with one end of the calming portion forming at least one discharge opening for releasing a steam-air-milk mixture from the mixing vacuum-chamber to the outside; and the calming portion comprises a plurality of calming conduits that have a parallel flow direction, and that each form a respective discharge opening at one open end for discharging a steam-air-milk-mixture partial flow to the outside.

Accordingly, the calming segment is no longer formed from a single bore. Instead, it comprises a plurality of calming conduits, which possess a parallel flow direction. Their intakes are connected to one another at the vacuum-chamber exit, and all of the exits of the calming conduits are open and thereby represent discharge openings for the produced steam-air-milk mixture or the milk froth. Furthermore, the calming conduits are preferably disposed essentially parallel to one another to create an especially compact arrangement.

According to a feature of the invention, it can suffice to provide at least three calming conduits having a parallel flow direction and identical flow cross-sections, and advantageously the conduits are spaced from one another. These conduits divide the steam-air-milk mixture that has been produced in the vacuum chamber into partial flows at the exit of the chamber, with the number of partial flows corresponding to the number of calming conduits. The diameter of each calming conduit is fairly small, so its length can likewise be relatively small in order to achieve a desired diameter-length ratio for compressing and calming the steam-air-milk mixture. Thus, the component encompassing the calming conduits can be compact.

The process of mixing the steam-air-milk mixture that flows from the mixing vacuum chamber has already been completed by the time the mixture enters the calming conduits, particularly because no flow line of a calming conduit is connected to a flow line of an adjacent calming conduit. For this reason, the mixture is effectively calmed in the calming conduits. A further advantage of dividing the calming portion into a plurality of conduits, each having a significantly smaller cross-section than a single calming conduit, is that this arrangement acts as a bubble sieve, which prevents the escape of larger foam bubbles that are formed during the mixing process in the vacuum chamber, and therefore results in an especially fine-pored and stable milk froth.

In accordance with one embodiment of the invention, the vacuum-chamber exit comprises solely the calming conduits having a parallel flow direction. That is, no further structures that influence the flow are interposed between the vacuum chamber and the calming conduits.

To this end, the device is formed with a cylindrical space in the nozzle arrangement, which encompasses the mixing vacuum chamber and the calming conduits that constitute its exit.

This feature makes the device simple to produce.

To further simplify production, the conduits can be formed out of a filling core that is produced separately from the nozzle arrangement, and then inserted into a lower portion of the cylindrical space in the nozzle arrangement.

A further advantage is that the filling core can easily be removed from the lower segment of the cylindrical space, for example for the purpose of cleaning or replacement.

It is further advantageous in terms of manufacture and maintenance for the calming conduits to be formed in the outer surface of the cylindrical filling core, coaxially with respect to its axis of rotational symmetry, and with equidistant spacing around the circumference. It is pointed out here that, after the filling core has been inserted, its axis of rotational symmetry coincides with that of the cylindrical space of the nozzle arrangement.

In a modification of the invention, the filling core can be formed with a cylindrical main portion and a dome-shaped end portion that faces the vacuum chamber after the core has been installed in the chamber. In this case, the calming conduits, having been formed in the outer surface of the cylindrical main portion, extend further toward the dome-shaped end with an elliptical depression. This depression thus extends in the direction of the center axis or the axis of rotational symmetry of the filling core, which attains a uniform, satisfactory flow into the calming conduits.

To achieve the aforementioned bubble-sieve effect, and therefore the desired consistency of the steam-air-milk mixture exiting the calming portion as milk froth, despite the compact, short embodiment of the calming portion, the clear diameter of each calming conduit should not exceed an amount comprising the diameter-length ratio of the calming portion of 1 to at least 10, divided by the number of calming conduits making up the calming portion.

As mentioned above, the steam-air-milk mixture is already completely mixed when it enters the calming conduits. The homogeneous mixing is performed by the pre-mixing chamber, as well as an embodiment of the device, in which the steam nozzle opening in the nozzle arrangement is disposed at an upper, first end of the vacuum chamber, which is located opposite the lower, second end of the vacuum chamber, where the vacuum-chamber exit with the calming conduits is located. In this arrangement of the nozzle opening, the air-milk mixture, which is suctioned, pre-mixed, into the vacuum chamber via a preferably nozzle-shaped line, is thoroughly mixed with the steam exiting the nozzle opening via a large portion of the vacuum chamber.

Two exemplary embodiments of the invention are explained in detail below in conjunction with a drawing having two figures.

BRIEF DESCRIPTION OF THE DRAWINGS

FIG. 1 is a longitudinal section through a first embodiment of the inventive nozzle arrangement portion of a device for producing milk froth for cappuccino.

FIG. 2 is a view of the first embodiment from below.

FIG. 3 is a longitudinal section through a second embodiment of the nozzle arrangement according to the invention.

DETAILED DESCRIPTION OF THE INVENTION

The first embodiment according to FIG. 1 includes a nozzle arrangement 1, with a cylindrical housing 2 which has a inner cylindrical space and that is initially open at a lower end 3. At an upper end 4 located opposite the lower end 3, the cylindrical space of the housing 2 is essentially closed by a cap with a nozzle opening 6, which is connected downstream of a steam supply line 5. The upper end 4 is also referred to as the first end, and the lower end 3 is referred to as the second end. The nozzle arrangement 1 having the cylindrical housing 2 and the nozzle opening 6 is essentially formed to be rotationally symmetrical about an axis 8 of rotational symmetry.

A supply line 9 for an air-milk mixture, which has been produced in a pre-mixing chamber 25, extends from the pre-mixing chamber 25 through the wall of the housing 2 and terminates in the cylindrical space, near the upper end 4 and adjacent the outlet of the nozzle opening 6. A milk supply line 29 and an air conduit 27 end in the pre-mixing chamber 25.

A core 10 is inserted into a portion 7, also referred to as the lower portion of the housing 2, that adjoins the lower or outlet end 3 of the housing and substantially fills the cylindrical space of the portion 7. The filling core 10 is configured with an essentially cylindrical main portion 11 and an upper, dome-shaped portion 12. A plurality, e.g., six thoroughgoing calming conduits 13 through 18 are formed on the surface of the two portions 11 and 12 of the filling core 10. These calming conduits or channels 13–18 are disposed concentrically with respect to the axis 8 of rotational symmetry, and equidistantly around the circumference as can be seen in FIG. 2. As FIG. 1 shows in detail, the flow conduits, here 14 and 17, are grooves in the surface of the core 10 and have the same radial depth over the cylindrical main portion 11, and are recessed slightly elliptically with respect to the center axis or the axis 8 of rotational symmetry over the dome-shaped portion 12. The calming conduits 13 through 18 are therefore parallel to one another in terms of flow direction and geometry.

When steam is supplied into the described nozzle arrangement 1 via the steam supply line 5, the illustrated embodiment of the nozzle arrangement 1 effects a vacuum in an upper portion of the cylindrical housing 2, above the lower portion 7 filled by the filling core 10, as steam flows out of the nozzle arrangement 6. The upper portion is therefore a vacuum chamber 19, which is extensively closed at the upper end 4 of the cylindrical housing 2 by the cap for the nozzle opening 6, on the one hand, and at the bottom by a top side 20 of the core 10, on the other hand. The vacuum in the vacuum chamber 19 propagates via the supply line 9 into the pre-mixing chamber 25, into which milk and air are consequently suctioned, and mixed. The resulting air-milk pre-mixture is suctioned into the vacuum chamber 19 via the nozzle-shaped supply line 9, where it is homogeneously mixed with the steam flowing into the vacuum chamber 19 via the nozzle opening to form a steam-air-milk mixture that occupies the space up to the top side 20 of the filling core 10. The vacuum chamber 19 is therefore also referred to as the mixing vacuum chamber.

The steam-air-milk mixture created from the air-milk pre-mixture in the vacuum chamber 19 does not need to be additionally mixed, but merely calmed and slightly compressed so that it flows out of discharge openings of the device as milk froth having the desired consistency for cappuccino. The discharge openings are formed by the open ends of calming conduits 13 through 18 at the lower end 3 of the nozzle arrangement 1 or the cylindrical housing 2.

Because the clear cross-sections of the calming conduits 13 through 18 are identical, and they are disposed symmetrically with respect to the axis 8 of rotational symmetry, all of the calming conduits are practically filled with uniform steam-air-milk partial flows exiting the mixing vacuum chamber 19. These steam-air-milk-mixture partial flows are effectively calmed and compressed in the individual calming conduits 13–18, because their diameters or clear cross-sections are small in comparison to their length extending over the cylindrical main portion 11 and the dome-shaped portion 12 of each calming conduit. To define the diameters or cross-sections, actually formed-out cross-sections of the calming conduits, for example semicircular or square ones, can be approximated by imaginary circular cross-sections.

It has been seen that the embodiment shown in FIGS. 1 and 2, in which the calming conduits 13 through 18 directly form an exit having discharge openings of the vacuum chamber 19 to the outside, yields a fine-pored, stable milk froth. In this case, the throughput through the calming conduits can be greater overall than was typical to this point. The larger throughput has the advantage that the flow speed at the exit of the calming conduits is lower, and a residual steam flow occurring at the end of the frothing process has less of a negative impact on the froth that has been produced and collected beneath the discharge openings. The number of calming conduits can also be reduced, but the conduits can retain the same dimensions, if a lower throughput is desired.

The embodiment according to FIG. 1 is advantageous in manufacturing terms, because the mixing vacuum chamber 19 is simply formed out of a portion of the throughgoing cylindrical space of the housing 2 of the nozzle arrangement 1, which is extensively sealed at its upper end and extensively sealed at the exit side in an uncomplicated manner by the filling core 10 inserted into the lower end of the housing 2. The nozzle-shaped supply line 9 is preferably formed by an air-milk nozzle 26 extending into the vacuum chamber 19.

The second embodiment of the device, which is illustrated in FIG. 3, differs from the first embodiment in that the inner wall of the housing 2 below the air-milk mixture supply line 6 is provided with an inwardly directed portion 30 having a downwardly conically tapering central opening 23, and housing a domed-shaped lower surface portion 24, i.e., the surface facing the end 3 of the housing 2. As a result, nozzle arrangement 21 has an essentially cylindrical vacuum chamber 22 at its upper and followed by an inside, conical lower portion having a central opening 23 ending above the top side 20 of the filling core 10. Thus, the interior space of the housing 2 is no longer fully cylindrical but rather forms a dome-shaped portion below the opening 23. The filling core 10 is formed as in FIGS. 1 and 2. The filling core 10 is inserted into the dome-shaped portion 24, disposed beneath the opening 23. Because the calming conduits 13 through 18 of the filling core 10 directly adjoin the opening 23 beneath the conical portion 22, they represent the beginning of a calming portion that is formed by the parallel calming conduits 13 through 18. The mixing vacuum chamber 22, also formed as in the first embodiment, likewise has an exit with calming conduits 13 through 18, which constitute the discharge openings at the lower end of the chamber and for the nozzle arrangement.

Also in this embodiment, the steam-air-milk mixture is produced with the air-milk pre-mixture formed in the pre-mixing vacuum chamber 25, from which the nozzle-shaped supply line 9 with the air-milk nozzle 26 leads to the vacuum chamber 22. Afterward, only one compression and one calming of the mixture occur in the vacuum-chamber exit comprising the opening 23 and the calming conduits 13 through 18. The mixture exits as milk froth from the discharge openings formed by the calming conduits opening to the bottom.

The invention now being fully described, it will be apparent to one of ordinary skill in the art that many changes and modifications can be made thereto without departing from the spirit or scope of the invention as set forth herein.

What is claimed is:

1. A device for producing milk froth for cappuccino, comprising: a nozzle arrangement disposed downstream of a steam supply line, and containing a mixing vacuum chamber, into which a steam-nozzle opening opens, and in which an air-milk-mixture supply line, leading from a pre-mixing chamber, terminates, with the pre-mixing chamber being connected to an air conduit and a milk supply line, and wherein: the nozzle arrangement further includes a calming portion disposed at an exit of the vacuum-chamber, with one end of the calming portion forming at least one discharge opening for releasing a steam-air-milk mixture from the mixing vacuum-chamber to the outside, and the calming portion comprises a plurality of calming conduits that have a parallel flow direction, and that each form a respective discharge opening at one open end for discharging a steam-air-milk-mixture partial flow to the outside.

2. The device according to claim 1, wherein the plurality of the calming conduits having parallel flow directions are directly disposed at and form the vacuum-chamber exit.

3. The device according to claim 1, wherein the nozzle arrangement includes a cylindrical housing defining a cylindrical space, with an upper end of the cylindrical housing being closed, with the exception of the steam nozzle opening, and with the cylindrical space being closed, with the exception of the calming conduits, at a lower end located opposite the upper end, and with the calming conduits forming the discharge openings for the nozzle arrangement at respective lower, open ends; and wherein the vacuum chamber is formed in a portion of the cylindrical space between the steam nozzle opening and the calming conduits, and the supply line of the air-milk mixture from the pre-mixing chamber terminates into the thus formed vacuum chamber.

4. The device according to claim 3, wherein the calming conduits are formed in an essentially cylindrical filling core that is inserted into and fills a lower portion of the cylindrical space of the housing of the nozzle arrangement.

5. The device according to claim 4, wherein the calming conduits are formed as grooves in an outer surface of the essentially cylindrical filling core, equidistantly around a circumference of the core, and essentially parallel to an axis of rotational symmetry of the filling core.

6. The device according to claim 5, wherein the filling core has a cylindrical main portion and a dome-shaped end portion that faces the vacuum chamber, and the calming conduits formed in the outer surface of the cylindrical main portion extend over the dome-shaped end portion, and are recessed into the outer surface of the domed end portion in an elliptical fashion.

7. The device according to claim 1, wherein a clear diameter of the cross-section of each calming conduit is dimensioned with a diameter to length ratio of at least 1 to 10, divided by the number of calming conduits.

8. The device according to claim 1, wherein the calming conduits are disposed essentially parallel to one another.

9. The device according to claim 1, wherein at least three calming conduits having essentially identical flow cross-sections and equidistant spacing are provided.

10. The device according to claim 1, wherein the calming conduits are parallel to an axis of rotational symmetry passing through the vacuum chamber.

11. The device according claim 1, wherein the nozzle opening in the nozzle arrangement is disposed at an upper end of the vacuum chamber, which is located opposite a lower end of the vacuum chamber, at which the vacuum-chamber exit having the calming conduits is located.

12. The device according to claim 11, wherein the interior wall of the housing below the steam nozzle and the air-milk supply line is provided with an inwardly directed portion having a downwardly directed conically tapering central opening; and wherein the filling core is disposed in the lower end of the housing with an upper end adjacent the central opening.

13. The device according to claim 1, wherein a lower surface of the inwardly directed portion is dome-shaped; and the filling core has a dome-shaped upper portion which extends adjacent the dome-shaped surface.

14. The device according to claim 1, wherein the supply line of the milk-air mixture has a nozzle-shape at its termination into the vacuum mixing chamber.

* * * * *